Nov. 7, 1961 E. A. ZUZELO Re. 25,077

MASONRY SAW

Original Filed April 17, 1956 2 Sheets-Sheet 1

INVENTOR.
EDWARD A. ZUZELO

BY John D. Myers

ATTORNEY

MASONRY SAW

Original Filed April 17, 1956 2 Sheets-Sheet 2

INVENTOR
EDWARD A. ZUZELO

BY John D. Myers

ATTORNEY

United States Patent Office

Re. 25,077
Reissued Nov. 7, 1961

25,077
MASONRY SAW

Edward A. Zuzelo, Narberth, Pa.

Original No. 2,836,168, dated May 27, 1958, Ser. No. 578,687, Apr. 17, 1956. Application for reissue Feb. 17, 1959, Ser. No. 793,941
13 Claims. (Cl. 125—13)

Matter enclosed in heavy brackets [ ] appears in the original patent but forms no part of this reissue specification; matter printed in italics indicates the additions made by reissue.

This invention relates generally to cutting machines and, more particularly, to a saw for cutting brick, stone, tile and like materials.

An object of the invention is to provide a masonry saw of the type having a cutting blade carried by a head or platform pivotally mounted on a frame above the work-supporting base of the machine with means wherein the frame is adjustable vertically throughout a continuous range of adjustability, whereby the platform may be placed at any desired level above the base.

Another object is to provide a masonry saw having a work-supporting base over which a platform carrying a cutting blade is pivotally mounted and having a pedal-actuated linkage for moving the platform about its pivot with means including a resilient coupling member of wide adjustability whereby the rigidity of the platform in applying the cutting blade to the work may be appropriately adjusted to avoid the imposition on the blade of stresses exceeding a predetermined amount.

A further object is to provide a masonry saw having a cutting blade carried by a platform pivotally mounted above a work-supporting base and including a pedal-actuated linkage for controlling the pivoting of the platform and the attendant movement of the cutting blade toward and away from a workpiece with means including an adjustable coupling member for selectively positioning the platform throughout a continuous range of angles about its pivot, independent of the level of the pivot above the base.

Other objects and advantages of the invention will appear from the following description relating to a presently preferred embodiment thereof as illustrated in the accompanying drawings in which.

Referring now to the drawings, wherein like reference characters designate like or similar parts, with similar modifications indicated by primed characters, the masonry saw comprises a base member shown generally as 10 in FIG. 1 which includes a rectangular pan or reservoir

Figure 2:
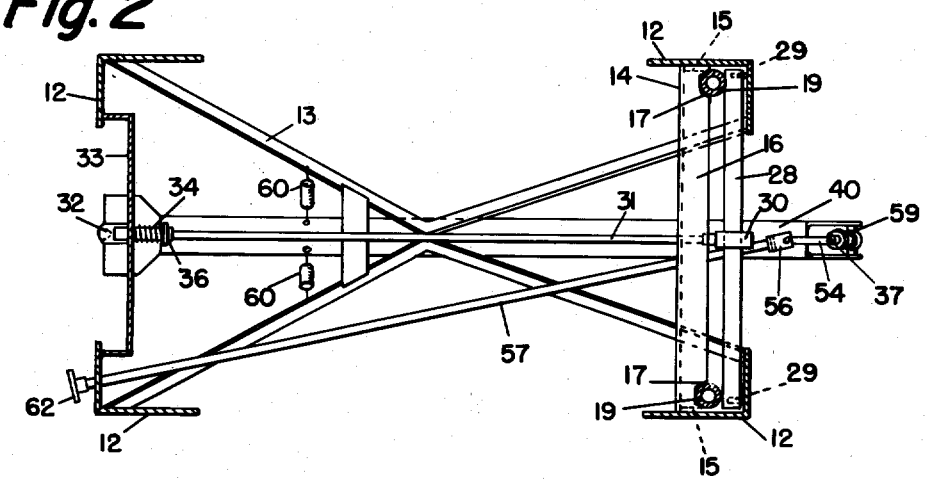
FIG. 2 is a horizontal sectional view taken along line 2—2 in FIG. 1.

11 supported at the corners by flanged legs 12. As shown in FIG. 2, a substantially X-shaped brace 13 is fixed at its ends to the legs 12 to improve the rigidity of the base member. Extending between the rear legs of the base is a guide member 14 which, in the form illustrated, comprises a generally channel-shaped portion provided with ears 15 bent over at its ends. The guide member 14 is conveniently secured to the base member by welding the ears 15 respectively to the legs 12 against which they abut. Each of the opposed upper and lower flanges 16 of the channel is provided with a pair of notches 17, the notches in the respective flanges being vertically aligned, thereby providing, in effect, a pair of parallel guide grooves for accommodating structural portions of a frame presently to be described.

The frame member previously referred to, which is generally designated as 18, preferably comprises a pair of spaced posts 19 rigidly connected adjacent their top ends by a cross-bar 20, and the posts are disposed in the notches 17 and movable therein for vertical adjustment of the frame member relative to the guide 14. The frame member 18 carries at its upper end, on an axle 21, a head or platform 22 which carries forwardly of the axle a cutting blade 23, and, rearwardly of the axle in counterbalancing relation, a motor 24 for driving the blade. A carrier 26 for carrying a tile or other object to be cut by the cutting blade is mounted on flanged wheels 27 adapted to engage the upper longitudinal edges of the pan 11 for fore and aft movement of the carrier under the cutting blade.

A clamping member, shown in the form of a transverse retaining bar 28, is positioned adjacent the posts 19 at the rear side of the latter, i.e., at the opposite side from the grooves formed by the notches 17 in the guide 14, and forwardly directed pins 29 projecting from the rear legs 12 serve to maintain the bar 28 substantially horizontal. An eye member 30 surrounds the retaining bar 28 substantially at its midpoint, and a control rod 31 extending longitudinally of the machine connects the eye member with a manual cam locking member 32 adapted to engage a transverse apron 33 extending between the forward legs of the machine. A compression spring 34 surrounds the control rod 31 adjacent the apron 33 and rearwardly thereof, the spring being held in compression against the apron by a shoulder 36 on the rod, whereby the retaining bar 28 is urged out of engagement with the posts 19 when the rod 31 is not drawn forwardly by operation of the cam member 32.

Movement of the platform 22 about its pivot or axle 21, for the purpose of applying the cutting blade to the work, is achieved by means of an arm or [link] *standard* 37 operatively connected at its upper end through an adjustable resilient connection 38 (FIG. 5) to the platform 22 rearwardly of the pivot 21, the arm 37 also being pivotally connected at a point along its length, by means of a locking coupling 39, to a *crank member or* foot lever 40 pivotally mounted on a rod *or fulcrum means* 41 extending between the rear legs 12 of the base member.

Figure 5:
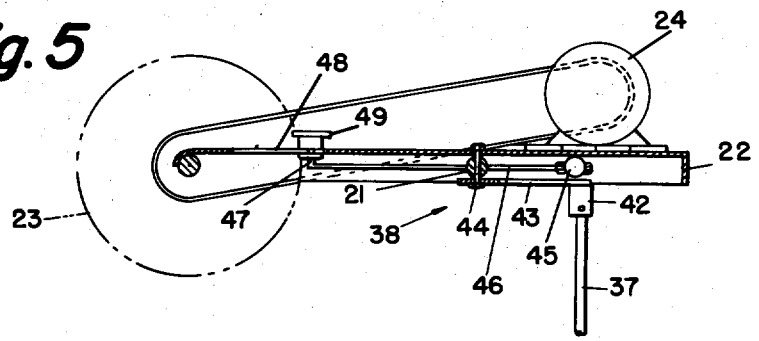
FIG. 5 is a detail view in vertical section, partly in elevation, of the platform for carrying the cutting blade, and appurtenant parts, showing a preferred form of the mechanism for adjusting the rigidity of the platform with respect to its mounting.

Referring specifically to FIG. 5, it will be seen that the arm 37 terminates at a pivotally mounted saddle member 42 adjacent the underside of the platform 22. The resilient connection 38 includes a leaf spring 43 disposed beneath the platform and spaced therealong, the spring in the embodiment shown in FIG. 5 being supported adjacent its rearward end by the saddle 42, and being rigidly connected at its forward end to the platform 22 by means of a bolt 44. Where the platform is supported on a transverse axle, as in the embodiment hereinabove described, the bolt 44 passes through such axle. It will be understood, of course, that the platform may be supported on the frame 18 by means of trunnions projecting from the sides of the platform, and in the absence of the axle a suitable spacer sleeve will surround the bolt 44 to maintain the spring 43 properly spaced from the platform when the bolt is tightened.

A bearing member or fulcrum 45, which may take the form of a sphere, bar or short cylinder, is disposed between the platform 22 and the spring 43, the fulcrum being adjustable longitudinally of the spring. For convenience in effecting such adjustment, the fulcrum may be secured adjacent the rearward end of a rod 46 extending longitudinally of the platform and passing loosely through an opening in the axle 21. The rod 46 is bent upwardly at its forward end to form a handle portion 47 which extends through a longitudinal slot 48 formed in the platform 22 above the bent end, and a knob 49 is preferably fixed to the handle portion 47 for convenient manipulation by the operator. The fulcrum 45 may thus be moved longitudinally of the spring 43 to any desired position between the saddle 42 and the axle 21, whereby the resilience of the mounting may be adjusted.

Figure 1:
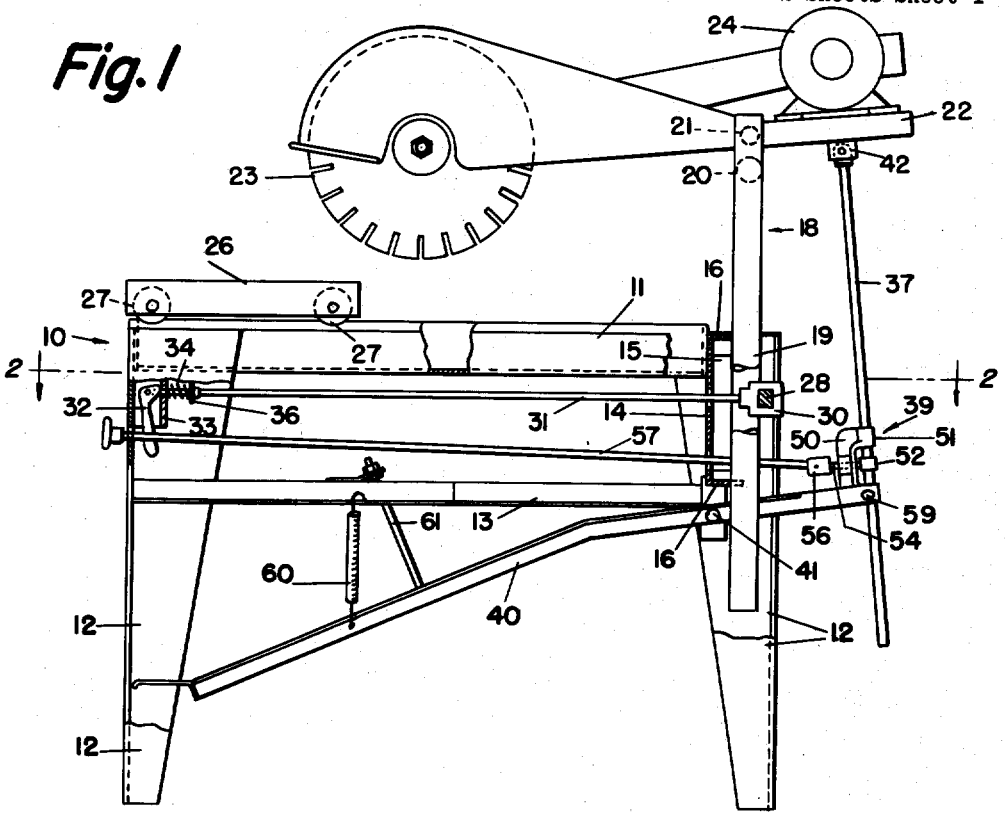
FIG. 1 is an assembly view in side elevation, certain parts being broken away to illustrate the construction more clearly.
Figure 3:
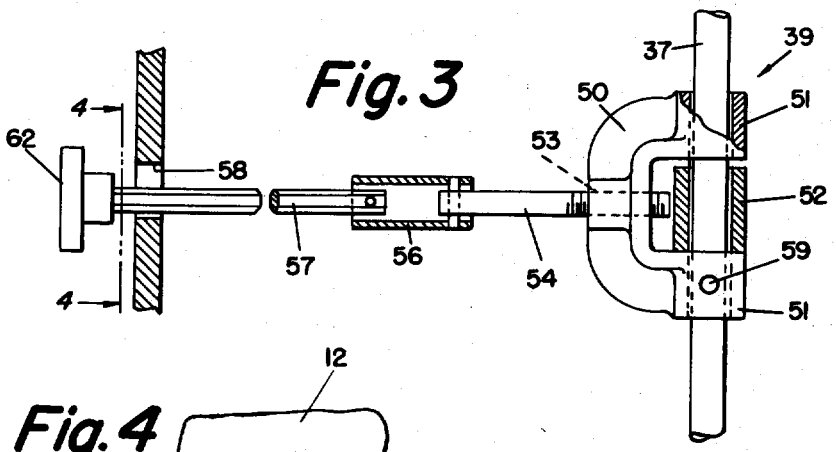
FIG. 3 is a detail view, on an enlarged scale, of a coupling employed in the linkage for controlling movement of the blade-supporting platform with relation to the work.

The mentioned locking coupling 39, shown in detail in FIG. 3, comprises a substantially C-shaped member 50 having a pair of spaced aligned sleeves 51 loosely surrounding the arm 37, and a collar 52 loose on the arm 37 between the sleeves. The member 50 is provided with a tapped opening 53 for receiving the threaded end of a rod 54 which acts as a set screw for applying pressure in opposite directions to the member 50 and the collar 52 whereby the opposed bearing surfaces in the sleeves 51 and the collar 52 are brought into locking engagement with the arm 37. If desired, of course, the upper sleeve 51 may be hook-shaped, and need not completely encircle the arm 37. Also, if desired, the collar 52 may be omitted, permitting the end of the threaded rod 54 to bear directly against the arm 37. The rod 54 is connected through a universal joint 56 to a rod 57 of hexagonal cross-section which extends forwardly to the front of the base 10 and passes through a keyhole-shaped opening 58 in one of the front legs 12. The C-shaped member 50 is pivoted to the bifurcated rear end of the foot lever 40 by any convenient means, as by *pintle means or* pins 59, whereby the arm 37, and the rearward end of the platform 22 to which it is operatively connected, may be raised and lowered by actuation of the foot lever 40 about its pivot 41. A pair of tension springs 60 connecting the brace 13 and the foot lever 40 urges the latter against a stop 61 depending from the brace 13. Thus, for any given position of the frame 18 relative to the base 10, when the foot lever is not in operation the springs 60 maintain the cutting blade 23 at its maximum elevation above the base as determined by the position of the locking member 50 on the arm 37. It will therefore be seen that the adjustable locking coupling 39 between the foot lever 40 and the arm 37 renders the platform 22 continuously adjustable about its pivot, i.e., capable of being locked in any of an infinite number of desired positions throughout the range of adjustability.

Figure 4:
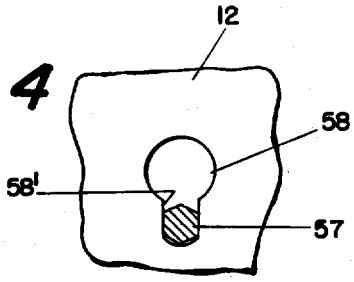
FIG. 4 is a sectional view taken along line 4—4 of FIG. 3.

A knob 62 is provided on the forwardly projecting end of the rod 57 for convenient manipulation of the set screw 54. It will be seen from FIG. 4 that the width of the slot 58' of the opening 58 is such that the rod 57 will be received therein only when two opposed faces of the latter are disposed parallel to the sides of the slot during insertion of the rod. Thus, after the set screw 54 has fixed the locking member 50 in any desired position on the arm 37, counter-rotation of the set screw may be prevented by dropping the hexagonal rod 57 into the slot 58'.

In operation, the position of the platform 22 above the base member 10 is first adjusted by releasing the retaining bar 28 through operation of the cam member 32 and thereafter moving the frame 18 into the desired position with respect to the guide member 14. The cam member 32 is then actuated to bring the retaining bar 28 into locking engagement with the frame 18 to secure the latter in the guide. With the supporting frame 18 thus positioned relative to the base member, the member 50 is locked on the arm 37 in the position that will produce the desired angularity of the platform relative to the base member when the foot lever abuts the stop 61 under the influence of the springs 60. The member 50 is locked on the arm 37 by manipulation of the knob 62 which operates the set screw 54, whereby the associated locking members (sleeves 51 and collar 52) may be brought into locking engagement with the arm 37.

Where the article to be cut is of heterogeneous composition, so that the cutting blade may suddenly encounter extremely refractory particles, or where the material to be cut is likely to seize the cutting blade, it is desired that the platform 22 may rotate about its pivotal mounting sufficiently to take up the shock to the blade which is likely to result during such conditions. This is achieved by appropriately positioning the fulcrum on the leaf spring, as described above.

Figure 6:
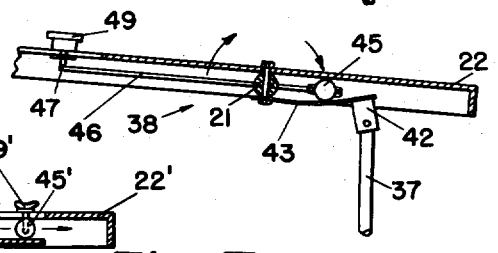
FIG. 6 is a view similar to FIG. 5 showing some of the parts in different positions.

An illustration of the increased flexibility of the resilient connection 38 resulting from positioning the fulcrum 45 at an intermediate point on the spring 43, with an accompanying freedom of the platform 22 to rotate about its pivot 21 in response to a resistance imposed on the cutting blade, is shown in FIG. 6, where the fulcrum 45 is located at an intermediate point of contact with the spring, i.e., somewhat to the left of the connection of the spring with the saddle 42.

Figure 7:
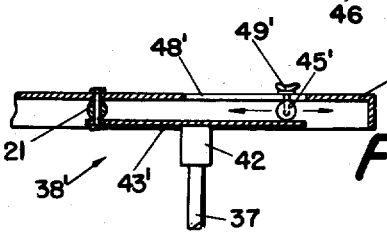
FIGS. 7 and 8 are detail views similar to FIG. 6, showing modifications of the mechanism for adjusting the rigidity of the platform with respect to its mounting.

In the modified resilient connection 38' illustrated in FIG. 7, the spring 43' is shown extending also rearwardly of the saddle 42, and the fulcrum 45 is adjustably secured on the spring between the saddle and the free end of the spring by winged bolt 49' threaded into the fulcrum from above through slot 48' in platform 22'. In this arrangement clockwise movement of the platform about its pivotal support is resisted in much the same manner as in the apparatus previously described; however, here the free end of the leaf spring (instead of an intermediate portion, as in FIG. 6) is depressed by contact with the fulcrum.

Figure 8:
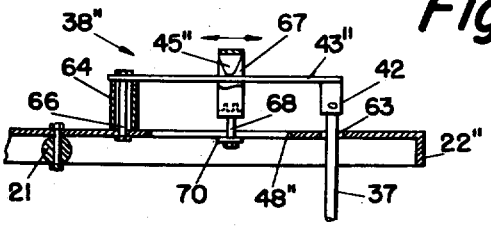

In the further modification 38'' illustrated in FIG. 8, the arm 37 passes through an opening 63 in the platform 22'' so that the spring 43'' is positioned above the platform, the spring being supported at its rearward end on the saddle 42 and at its forward end on a spacer member 64 extending upwardly from the platform *and secured thereto by bolt 66*. In this modification, the fulcrum 45'' is positioned above the spring and is carried by a strap 67 which surrounds the spring and is partly cut away to reveal the fulcrum inside. A bolt 68 depending from the strap passes through a slot 48'' in the platform and carries a washer 70 adjacent its lower end which bridges the slot. Clockwise movement of the platform (as viewed in FIG. 8) about its pivot 21 is resisted by contact of the spring 43'' with the overlying fulcrum 45''.

It will be apparent that the rigidity of the platform with respect to its mounting may be adjusted in any of the described modifications by moving the fulcrum longitudinally of the leaf spring, and that the rigidity of the mounting will be reduced in proportion to the distance the fulcrum is positioned from the saddle 42. The benefits of this and the other features of the invention will become fully apparent to those undertaking to practice it.

The claimed invention:

1. In a masonry saw, a base, guiding means affixed at constant level to the base, and a frame adapted to support a saw-carrying platform pivotally about a horizontal axis above the base and having a plurality of substantially vertically disposed cylindrical members located in engagement with the guiding means for slidable adjustment substantially vertically therealong to support the platform at any desired height throughout the entire range of adjustment of the platform above the base.

2. The apparatus of claim 1, in which the guiding means has indented guide portions spaced horizontally from one another, and the cylindrical members of the frame constitute a pair of parallel posts located for sliding engagement with the guide portions.

3. The apparatus of claim 2, comprising also retaining means, located adjacent the opposite side of the parallel posts from the indented guide portions of the guiding means, and clamping means adapted to force the retaining means against the posts and thereby wedge the posts against the indented guide portions to hold the frame in fixed position with respect to the base.

4. In a masonry saw, a base, an upstanding frame supported by the base, a platform pivotally mounted on the frame at a location above the base and positionable thereabout through a limited arc in a vertical plane, a saw located near one end of the platform away from the pivot location, a leaf spring spaced from the platform, means holding one end of the spring in fixed relation to the platform, a substantially vertical arm for positioning the frame about the pivot location, a saddle pinned pivotally to the arm and affixed to the opposite end of the spring.

5. The apparatus of claim 4, in which the spring normally is oriented substantially parallel to the platform, and comprising also a fulcrum element intervening between the platform and the spring and adjacent to both.

6. The apparatus of claim 5, in which the fulcrum element is located adjustably and has attached to it an adjusting member by which it is adapted to be positioned at any location between the ends of the spring.

7. In a masonry saw having a base and a saw-carrying platform above the base, the improvement comprising means slidably adjustable with respect to the base and adapted to position the platform throughout a continuous range of levels above the base and to support the platform for controlled pivoting in a vertical plane, control means similarly pivotable with respect to the base, linkage interconnecting the platform and the control means and including a leaf spring having a normal orientation substantially parallel to the platform, one end of the spring being held in fixed relation to the platform at the supporting pivot and the other end of the spring being pivotally attached to the rest of the linkage, and coupling means interposed in the linkage and adapted to position the platform throughout a limited continuous range of angles about the supporting pivot.

8. In a masonry saw having a base and a saw-carrying platform above the base, the improvement comprising means slidably adjustable with respect to the base and adapted to position the platform throughout a continuous range of levels above the base and to support the platform for controlled pivoting in a vertical plane, control means similarly pivotable with respect to the base, linkage interconnecting the platform and the control means, a leaf spring having a normal orientation substantially parallel to the platform, one end of the spring being held in fixed relation to the platform at the supporting pivot and the other end of the spring being pivotally attached to the rest of the linkage, an adjustable fulcrum element separating the platform and the spring, adjusting means for positioning the fulcrum element throughout the entire length of the spring, and coupling means interposed in the linkage and adapted to position the platform throughout a limited continuous range of angles about the supporting pivot.

9. In a masonry saw, a fixed base, a substantially horizontally disposed guide member affixed to the base and provided with a pair of horizontally tapered indentations spaced from one another in one side thereof, a saw-carrying platform located above the base, a pair of substantially vertically disposed, smooth-surfaced cylindrical members similarly spaced from one another, pivotally supporting the saw platform and engaging the tapered indentations of the guide member, and means for wedging the cylindrical members into the indentations, whereby the saw-carrying platform can be slidably adjusted to and fixed at any desired height above the base within the range of engagement of the cylindrical members with the indentations of the fixed guide member.

*10. A machine for sawing masonry, comprising a platform, a cutter assembly supported thereon, a frame supporting the platform for pivotal movement of the cutter assembly through a limited arc in a vertical plane about the locus of support, means for tilting the saw platform thereabout including a reciprocable arm extending from the vicinity of the frame to the vicinity of the platform and resilient means interposed between the arm and the platform and in contact with both, the resilient means being adapted and effective to transmit movement of the arm to the platform and thereby tilt it, and the platform being adapted also to tilt relatively independently of the arm to a limited extent dependent upon the flexibility of the interposed resilient means.*

*11. The apparatus of claim 10 including adjusting means in operative connection with both the platform and the resilient element and movable with respect thereto, the adjusting means being effective to vary the flexibility of the resilient means when moved with respect thereto.*

*12. The apparatus of claim 11 wherein the resilient element is a spring, and including a pair of threaded members in mating engagement with one another, one of the threaded members being in operative engagement with the platform, and the other of the threaded members being in operative engagement with the spring, at least one of the threaded members being movably adjustable to vary the relative engagement of the pair of threaded members with one another and thereby vary the flexibility of the spring.*

*13. The apparatus of claim 1 including means supported by the base, in operative connection with the frame, and adapted to hold the frame at fixed height with respect to the base, together with means supported by the base in operative connection with that holding means, and adapted to actuate the holding means to fix the height of the frame with respect to the base.*

References Cited in the file of this patent or the original patent

UNITED STATES PATENTS

| | | |
|---|---|---|
| 2,514,826 | Zuzelo | July 11, 1950 |
| 2,581,777 | Wright | Jan. 8, 1952 |
| 2,591,206 | Scott | Apr. 1, 1952 |
| 2,682,262 | Schultz | June 29, 1954 |
| 2,726,651 | Tucker | Dec. 13, 1955 |
| 2,726,652 | Brittain | Dec. 13, 1955 |
| 2,863,440 | Harclerode | Dec. 9, 1958 |

FOREIGN PATENTS

| | | |
|---|---|---|
| 1,105,322 | France | June 29, 1955 |